United States Patent
Kienberger

(10) Patent No.: US 6,788,780 B1
(45) Date of Patent: Sep. 7, 2004

(54) COMMUNICATIONS APPARATUS

(75) Inventor: Helmut Kienberger, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/623,647

(22) PCT Filed: Feb. 17, 1999

(86) PCT No.: PCT/DE99/00439

§ 371 (c)(1),
(2), (4) Date: Sep. 6, 2000

(87) PCT Pub. No.: WO99/46919

PCT Pub. Date: Sep. 16, 1999

(30) Foreign Application Priority Data

Mar. 9, 1998 (DE) .......................... 198 10 059
Mar. 27, 1998 (DE) .......................... 198 13 726

(51) Int. Cl.[7] .......................... H04M 3/00; H04M 5/00
(52) U.S. Cl. .......................... 379/266.05; 379/265.02; 379/266.04
(58) Field of Search .......................... 379/265.01–266.1, 379/220.01, 221.01, 258, 260, 262–269, 271–274

(56) References Cited

U.S. PATENT DOCUMENTS

| 4,694,483 A | * | 9/1987 | Cheung ................. | 379/265.06 |
|---|---|---|---|---|
| 4,757,529 A | * | 7/1988 | Glapa et al. ........... | 379/266.02 |
| 4,951,310 A | * | 8/1990 | Honda et al. .......... | 379/266.05 |
| 4,953,204 A | * | 8/1990 | Cuschleg et al. ...... | 379/266.05 |
| 5,117,454 A | | 5/1992 | Yamase | |
| 5,206,903 A | * | 4/1993 | Kohler et al. .......... | 379/265.12 |
| 5,309,513 A | * | 5/1994 | Rose ..................... | 379/265.12 |
| 5,335,269 A | * | 8/1994 | Steinlicht .............. | 379/266.05 |
| 5,592,542 A | * | 1/1997 | Honda et al. .......... | 379/266.05 |
| 5,832,070 A | * | 11/1998 | Bloom et al. .......... | 379/266.07 |
| 5,857,018 A | * | 1/1999 | Sumner et al. ........ | 379/265.13 |
| 5,903,641 A | * | 5/1999 | Tonisson ............... | 379/265.12 |
| 5,946,388 A | * | 8/1999 | Walker et al. ......... | 379/266.01 |
| 5,963,632 A | * | 10/1999 | Miloslavsky ................. | 379/219 |
| 5,970,135 A | * | 10/1999 | Lenihan et al. ....... | 379/266.02 |
| 5,995,614 A | * | 11/1999 | Miloslavsky ........... | 379/265.11 |
| 6,044,144 A | * | 3/2000 | Becker et al. ......... | 379/265.02 |
| 6,222,918 B1 | * | 4/2001 | De Kouchkovsky et al. ..................... | 379/265.13 |
| 6,222,919 B1 | * | 4/2001 | Hollatz et al. ........ | 379/265.12 |
| 6,466,661 B2 | * | 10/2002 | Krank et al. .......... | 379/212.01 |

OTHER PUBLICATIONS

Der Vermittlungsplatz EMS—Dieter Wulff— XP–002110401—Telcom report 2 (1979 (PCT Search Rear Only) (No Engl. Translation).

* cited by examiner

Primary Examiner—Fan Tsang
Assistant Examiner—Roland Foster
(74) Attorney, Agent, or Firm—Bell, Boyd & Lloyd LLC

(57) ABSTRACT

In a communication apparatus for a communication network, a call distribution unit distributes calls that come in for the communication network to a corresponding switching equipment unit, which is provided for accepting the calls and for forwarding the calls. The switching equipment unit comprises a different control unit, whereby a first type of control unit is responsible for calls of lower priority and a second type of control unit is responsible for calls of higher priority. When a corresponding interrogating key is operated, the calls of higher priority that are pending at the second control unit are accepted, whereas calls of lower priority that are pending at the first control unit are only accepted when calls of higher priority are not pending at the second control unit when corresponding call acceptance units are operated.

14 Claims, 3 Drawing Sheets

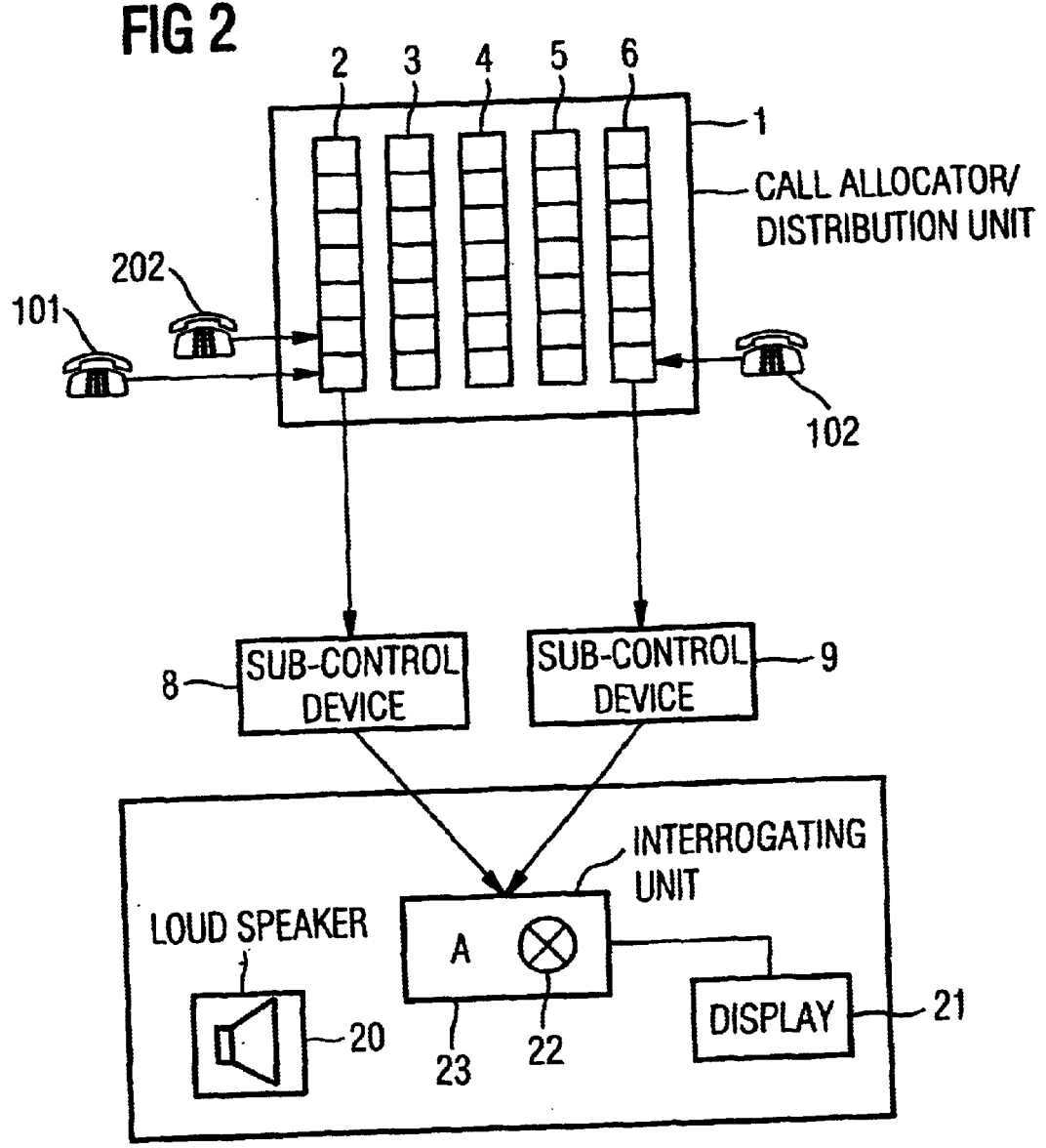

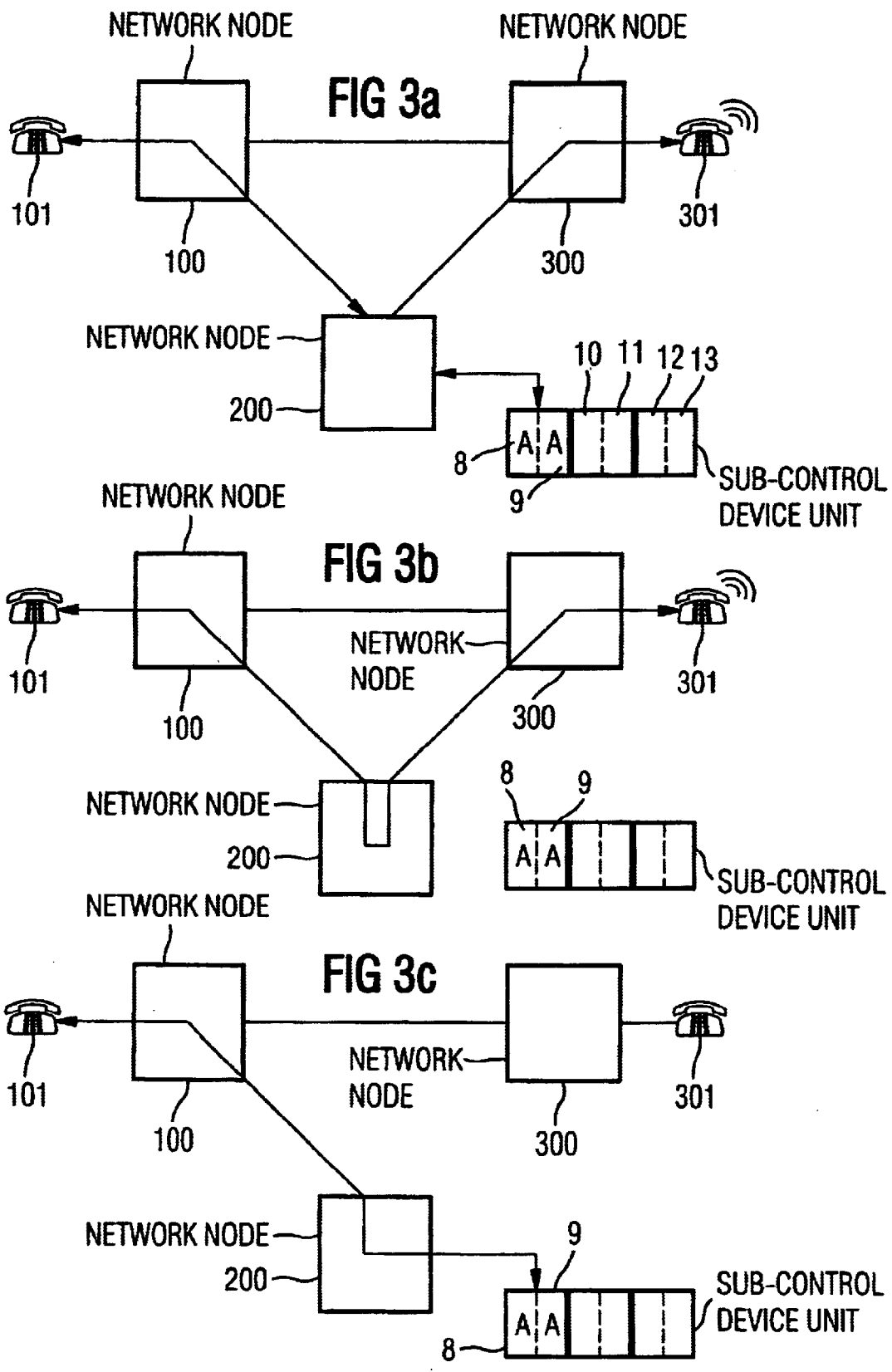

COMMUNICATIONS APPARATUS

The present invention relates to a communication apparatus for communication networks, particularly for private communication networks, whereby incoming calls, within the communication network, are distributed to a switching equipment unit of the communication apparatus by unit of a call distribution means and the calls applied to the switching equipment units are accepted by the switching equipment units and are potentially forwarded to a desired user of the communication network.

As known, switching equipments (also referred to as attendant consoles) are utilized for purposes of switching calls for users of a communication network, particularly of a private communication network.

At least one call distribution unit (also referred to as a call allocator), whose task it is to organize the incoming calls according to specific criteria and to distribute to a corresponding switching equipment unit, is provided in the communication network. In particular, the call distribution unit allocates the incoming calls, according to a FIFO principle (i.e. according to a call holding principle), to the corresponding switching equipment unit. The call distribution unit can comprise a plurality of queues (sub-queues), which are respectively responsible for calls of different priorities, whereby the call distribution unit processes the calls of the queue with the highest priority, the second highest priority etc. and successively applies the corresponding calls to the corresponding switching equipment unit.

Each of the switching equipment units has an operator console that comprises a plurality of interrogating keys, which different call types are allocated (such as trunk call, internal call etc.). The respective call, depending on its call type, is automatically allocated to the corresponding interrogating key of the operator console when the call distribution unit forwards a call, which operator console indicates a pending call by units of blinking, for example. Subsequently, the switching person can accept the respective call by means of pressing the corresponding interrogating key and, corresponding to the desires of the caller, can forward it to a user of the communication network.

Each interrogating key of the operator console has a control unit allocated (sub-unit), which is formed by a software function of the system software and whereby the call distribution means automatically applies the corresponding call to it and which comprises a corresponding software, as well as a corresponding database. Each control unit processes the key events of the corresponding interrogating key and represents a logical interrogating unit in addition to the interrogating key that serves as a physical interrogating unit.

The following problems can occur with the previously described communication apparatus or, respectively, switching equipment unit. As it has already been described above, a corresponding control unit (sub-unit, logical interrogating unit) is respectively allocated to each interrogating key (physical interrogating unit), which serves the purpose of answering or, respectively, accepting a call of a corresponding call type. When a call of the corresponding call type (call status) has been allocated by unit of the call distribution unit (call allocator), this control unit, as well as the corresponding interrogating key is blocked for further calls of the same call type until the accepted call has been forwarded. Further calls of the same call type cannot be allocated by the call distribution unit of this control unit and therefore must remain in a waiting status until the corresponding control unit has become free, even when the waiting calls have a higher priority than the currently accepted call. Generally, the priorities for the individual calls can be configured in the communication apparatus, i.e. that they can be prescribed by means of programming. Calls of higher priority can be emergency calls or secondary calls; here, particularly calls that are taken back after switching errors.

Besides, the need to switch calls, which have been erroneously switched to a wrong user by the switching equipment, back to the switching equipment again and therefore to take them back in order to subsequently switch these calls anew to the correct user is present with respect to the known communication apparatuses, particularly regarding the last mentioned call type. On principle, this is only possible up to a point at which the called user has not yet accepted the call. After the incorrectly switched call has been taken back, the incorrectly switched call is to be promptly connected again to the same switching equipment, namely to the attendant console via which the call has been erroneously switched before.

A solution for the previously described problem of incorrectly switched calls is already known; however, said solution is based on different system and hardware conditions compared to the present invention. The communication apparatus of this know solution does not comprise the call holding principle, as it is with respect to the communication apparatus corresponding the present invention. Instead, a plurality of keys are provided at the switching equipment unit, whereby a first type of keys automatically signalize incoming calls by means of blinking (potentially at the same time). Further, a second type of keys is provided, which serve as interrogating unit in the sense of the switching equipment units according to the present invention. For purposes of switching a pending call, the switching person can accept the corresponding call by means of pressing upon a blinking first key and can allocate it to one of the second keys. In contrast to the communication apparatus of the type described above, which is relevant for the present invention, the switching person therefore has a,selection possibility— which call is allocated to which interrogating key—with respect to, this species of the known communication apparatus. This selection possibility is not present with respect to the communication apparatus according to the type, since the call distribution unit (call allocator), depending on the corresponding call type, automatically allocates each call here to the corresponding interrogating key of the operator console of the switching equipment unit. Given the previously described known communication apparatus, it is possible to take calls back after switching errors, whereby a call that is taken back is directly switched to a free second key by means of the system. This is particularly possible with respect to this solution, since the second keys are not automatically occupied by incoming calls, so that the previously described problems basically do not occur here.

SUMMARY OF INVENTION

Therefore, the present invention is based on the object of creating a communication apparatus of the type described above, namely a communication apparatus, wherein the interrogating units are automatically occupied with calls; wherein waiting times can be avoided for calls of higher priority. The retrieval of incorrectly switched calls is to be particularly possible with the aid of this communication apparatus.

According to the invention, a communication apparatus is provided for a communication network. At least one switching equipment unit is provided in order to accept calls within the communication network and in order to forward the accepted calls to a desired user of the communication network. At least one call distribution is provided in order to distribute incoming calls within the communication network to the at least one switching equipment unit, whereby the switching equipment unit comprises a first control unit, the call distribution unit automatically applying calls of lower priority thereto, a second control unit whereby the call distribution unit automatically applies calls of higher priority thereto, and a call acceptance unit allocated to the first and second control units, said call acceptance unit, when actuated, accepting a call that is pending at the second control unit, or, when no call is pending at the second control unit, the call acceptance unit accepting a call that is pending at the first control unit.

According to the present invention, at least two control units are allocated to the individual call acceptance units or, interrogating units, whereby the one control units are responsible for calls of low priority and the other control units are responsible for calls of higher priority. The call acceptance units are together allocated to the individual control units and can be particularly formed in the form of interrogating keys with light-emitting diodes, which blink when a corresponding call is pending. Further, each pending call can be displayed in the display of the switching equipment or, of the corresponding operator console.

The call distribution units of the inventive communication apparatus distributes the incoming calls to the individual switching equipments units, whereby the callers are advantageously allocated to the corresponding first or second control units depending on the respective call type. A call that is pending for an interrogating key at the switching equipment unit is, for example, visually displayed for the switching person, whereby the switching person can accept the call of the corresponding call type by means of operating the interrogating key. What is achieved by means of the inventively proposed utilization of two separate control units is that the call that is pending at the control unit, which is responsible for calls of higher priority, is automatically through-connected when an interrogating key is operated, whereas a call that is pending at the control unit, which is responsible for calls of lower priority, is only connected when a call of higher priority is not pending. Thus, the waiting time for calls of higher priority can be significantly reduced.

According to a version of the present invention, the switching equipment can be informed of all pending calls of the switching equipment unit, the display or a graphic operating surface. In particular, this is the case for all calls of higher priority. Subsequently, the switching equipment unit can accept the desired call via a keyboard or a mouse etc. and can potentially forward it.

Besides, the design of the communication apparatus of the present invention makes it possible to rapidly take incorrectly connected calls back to the switching equipment unit before the called user has accepted the call, since, in this case, the call that is taken back is promptly switched again to the corresponding control unit, which is responsible for calls of higher priority, by means of operating a corresponding call retrieval key, so that the call that is taken back can be promptly connected to the switching person.

The proposed solution of the invention basically makes it possible to take over the existing communication apparatus mainly unchanged, and the realization can occur by a simple adaptation of the software. The existing operator surface for purposes of interrogating pending calls can be kept unchanged, whereby great flexibility is guaranteed at the switching equipment unit with respect to the switching of calls, although a relatively small number of keys are utilized.

The invention is subsequently explained in greater detail on the basis of preferred exemplary embodiments upon reference to the enclosed drawing.

BRIEF DESCRIPTION OF THE DRAWINGS

FIG. 2 shows an enlarged illustration of a section of FIG. 1 for purposes of explaining the call distribution and the call interrogation with respect to the exemplary embodiment shown in FIG. 1, and FIGS. 3*a–c* show simplified illustrations for purposes of explaining the retrieval of calls with respect to the communication apparatus of the invention.

DESCRIPTION OF PREFFERED EMBODIMENTS OF THE INVENTION SHOWING

Figure 1:
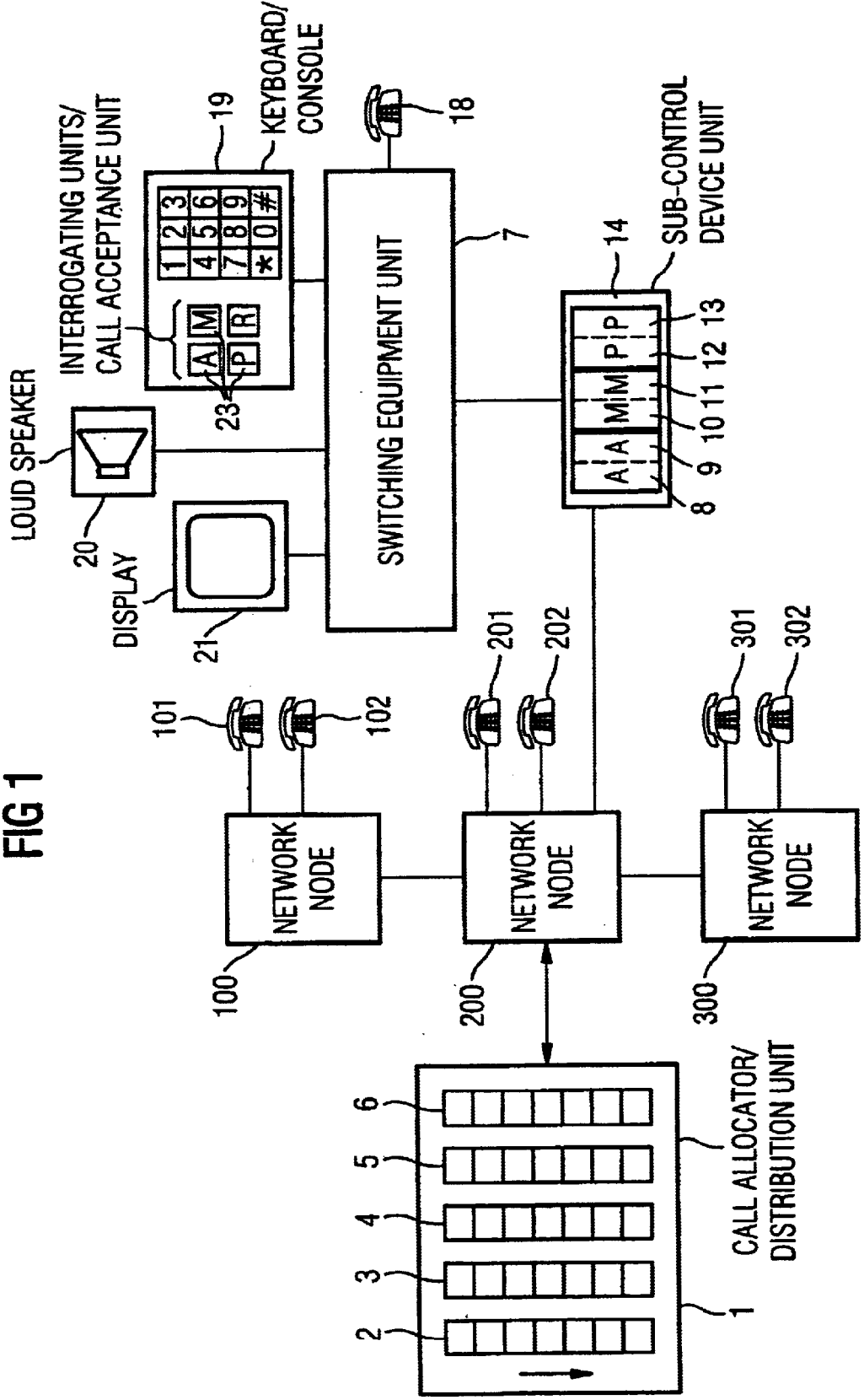
FIG. 1 shows a simplified block diagram of a preferred exemplary embodiment of the communication apparatus of the present invention.

FIG. 1 shows the principal structure of a preferred exemplary embodiment of a communication apparatus on the basis of a schematic block diagram. According to FIG. 1, the communication apparatus comprises, for example, three signaling terminals or network nodes 100, 200 or, respectively, 300, which are respectively operated by means of at least one call allocator or call distribution unit 1 in order to supply incoming calls to the attendant consoles of the corresponding network node. FIG. 1 merely exemplary shows a call allocator 1, a control units (system software) 14 and an operator console 7 that can be operated by a switching person via a keyboard 19. Further, a display or a screen 21 is provided for purposes of visually displaying messages or calls. When a screen is utilized, the switching person can also make inputs via a graphic operator surface (e.g. with the aid of a mouse). Besides, a loudspeaker is connected for acoustic outputs. The operator console 7 serves the purpose of switching calls within the communication network, whereby—as will be subsequently explained in greater detail—calls allocated by the call alotter 1 can be displayed to the signaling terminal 200 at the operator console 7 or, respectively, at the display 21; can be accepted by the switching person and can be forwarded to a desired user of the communication network. Normally, an operator console 7 is connected to each network node 100–300 by means of which incoming calls can be forwarded to connected users 101, 102, 201, 202 or, respectively, 301, 302. Besides, a speaker units 18 is coupled to the actual operator console 7 so that the switching person can accept incoming calls and can be personally reached as well.

The control units 14 comprises sub-control units 8–13, which are respectively implemented in the system software of the network node 200. The control units 14 particularly represents the interface between the call alotter 1 and the operator console 7 of the corresponding attendant's position.

The communication apparatus is designed such that different call types can be processed. It can be differentiated between a trunk call, an internal call (i.e. a call within the preferably private communication network), an emergency call or secondary calls etc, for example. A specific priority can be allocated to each call or, respectively, to each call type by means of correspondingly programming the communication apparatus. For example, calls of normal priority are generally first calls, whereas calls of high priority are, for example, emergency calls or secondary calls to the switching equipment units. Forwarded calls, which, under certain conditions, come back again to the same switching equipment units that has previously switched the call are called secondary calls, while first calls are arbitrarily allocated to a free switching equipment units by means of the call allocator 1. For example, these can be repeated calls when the called user does not answer within a specific time-span subsequent to the switching of the switching equipment unit, or chain calls, wherein the first caller wants to come back again to the same switching equipment unit after the first conversation, since he has another connection request. Finally, secondary calls of higher priority also comprise calls that are taken back after switching errors, i.e. calls regarding which the switching person has connected a caller incorrectly and wants to take him back again before the erroneously called user accepts the call. What all these calls of higher priority have in common is that they are to be promptly treated and connected to the switching equipment unit.

A certain priority treatment is already implemented in the call allocator 1. As it has already been mentioned, the call allocator 1 registers all calls that come in within the switching equipment group allocated to it and distributes these further to the corresponding switching equipments units. The calls registered by the call allocator 1 are processed according to the call holding principle (FIFO-principle), i.e. the calls that come in first are also forwarded first to the responsible switching equipments. However, the call allocator 1 already recognizes the type and the priority of each call and assigns, particularly depending on the priority, the individual calls to different queues 2–6. Given the case shown in FIG. 1, the call allocator 1 therefore differentiates between five different priorities, whereby the call allocator 1, for example, arranges calls with the highest priority, such as emergency calls, in the queue 6 and arranges normal calls, such as trunk calls, in the queue 2. It can also be provided that a queue with corresponding sub-queues is provided per interrogating key of the switching equipment unit or, respectively, of the corresponding operating console, i.e. per call type. On one hand, the call allocator 1 distributes the calls parked in the queues depending on the priority of the calls and, on the other hand—given the same priority—depending on the arrival of the individual calls. This means that a call that is parked in the queue 2, for example, can only be forwarded to a switching equipment unit when no entries are present in the queues 3–6 for calls with higher priority or when the calls with higher priority cannot be forwarded as a result of a lack of corresponding resources.

Subsequently, the way of functioning of the communication apparatus shown in FIG. 1 is explained in greater detail.

As it has already been explained, the call allocator 1 serves the purpose of applying the calls that occur in the communication network to the corresponding switching equipment units 7. When the call allocator 1 has taken a temporarily parked call from one of its queues 2–6, it is applied to a corresponding sub-control device (subunit) 8–13 via sub-control device unit the interface means 16 of the corresponding switching equipment unit 7, whereby respectively at least two sub-control devices 8/9, 10/11 or, respectively, 12/13 are allocated to a corresponding interrogating key 23 (call acceptance unit) of the keyboard 19 of the switching equipment or, respectively, of the attendant console 7. These interrogating keys 23 are referred to as "A", "M" and "P". Further, a key that is referred to as "R" is provided for the retrieval of the call.

The interrogating keys 23 ("A", "M", "P") are respectively allocated to a specific call type of the communication apparatus. Thus, a trunk call that is registered at the switching equipment unit 7 can be taken back and accepted via the interrogating key 23 referred to as "A", an internal call of the communication network can be taken back and accepted with the aid of the interrogating key 23 referred to as "M", and a private call for the switching person operating the switching equipment unit 7 can be taken back and accepted with the aid of the key referred to as "P" and an incorrectly connected call can be taken back and accepted by means of the key referred to as "R".

As it has already been explained, respectively at least two sub-control devices (subunits) 8–13 are provided for the interrogating keys "A", "M" and "P". Respectively one of these sub-control devices serves the purpose of accepting calls of normal or, respectively, low priority, whereas the other sub-control device serves the purpose of accepting special calls of higher priority of the corresponding call type. The interrogating keys 23 represent the physical interrogating unit of the switching equipment unit 7, whereas the individual sub-devices 8–13 represent the corresponding logical interrogating organs and comprise, for example, a corresponding software with database, whereby the individual logical interrogating organs 8–13 are respectively responsible for the corresponding call type of the physical interrogating units 23 allocated to them.

The responsibility of the individual sub-control devices 8–13 for the interrogating keys 23 of the keyboard 19 referred to as "A", "M", and "P" is subsequently explained in greater detail upon reference to FIG. 2.

FIG. 2 shows the case when a plurality of calls with normal priority are parked in the call allocator in the queue 2, while a call of higher priority is stored in the queue 6.

As it is particularly shown in FIG. 2, a call of, for example, the user 101 of the network node 100 and a call of the user 202 of the network node 200, whereby the switching equipment unit 7 is also connected thereto, is stored in the queue 2, while, for example, an emergency call of the user 102 is parked in the queue 2. The call allocator 1 allocates the calls parked in the queues 2–6 to the individual switching equipment units 7. In the present case, the two users 101 and 102, for example, wish to call a user for whom the switching equipment unit 7 is responsible. In the relevant case, both calls of the users 101 and 102 are trunk calls, in particular, so that both calls must be able to be interrogated by means of the call alotter 1 via the interrogating key 23 referred to as "A" at the switching equipment unit 7. Since the call of the user 101 is a call of lower priority, the call allocator 1 occupies the sub-control device 8 with this call, while the sub-control device 9 is occupied with the call of the user 102 at the same time, since this call is a call with highest priority. Both sub-control devices 8 and 9 correspond to the call type of the two calls and are therefore allocated to the interrogating key 23 referred to as "A". Each interrogating key 23 comprises a light-emitting diode 22, for example, so that not only a ring is output via the loudspeaker 20 but also the type of the pending call is made recognizable in that the corresponding interrogating key blinks when a call comes in at the switching equipment unit 7. In addition, the caller and the corresponding call type can be outputted via the display 21 of the switching equipment unit 7.

Given the announcement of a pending call via the loudspeaker 20, the light-emitting diode 22 and/or the display 21, the switching person normally does not yet know whether the pending call is a call of higher or lower priority. Besides, the switching person does not know whether even two calls are potentially pending for the respective blinking interrogating key 23 via the sub-control devices 8 and 9, i.e. a call with lower priority and a call with higher priority. Therefore, it can be provided that the display 21 of the corresponding operating console 7 is automatically overwritten with data regarding the call of higher priority when a call of higher priority is pending, so that the switching person is informed of calls of higher priority being pending or of the fact that a plurality of calls are waiting. The switching person operates the interrogating key 23; in the present case, he operates the interrogating key 23, which is referred to as "A". When special calls are not pending at the sub-control device 9, the call pending at the sub-control device 8, i.e. the call of lower priority, is interrogated by this action and is accepted by the switching person. However, when a call of higher priority is pending at the sub-control device 9, this call is certainly switched-through and accepted after the corresponding interrogating key has been operated, i.e. that merely the sub-control device 9 is activated and changes over into the talk state, while a call of lower priority, which is potentially present at the sub-control device 8, initially remains temporarily parked and is not accepted via the corresponding interrogating key 23 before the call of higher priority of the sub-control device 9 has been forwarded. Thus, it is assured that calls of higher priority, i.e. calls that are to be treated and forwarded especially fast and that arrive later at the switching equipment than the calls that are already pending, are not temporarily parked unnecessarily long in the queues of the call alotter 1 and can be particularly further processed, even when calls of lower priority are already pending at the individual sub-control devices of the switching equipment unit 7. After the switching person has accepted a call, he can dial-up the desired target user by means of operating the dial keys of the keyboard 19 (shown in FIG. 1) and can thus forward the call.

Advantageously, the switching equipment unit 7 is designed such that the call with the highest priority is automatically displayed at the display 21 of the switching equipment unit when a call comes in, i.e. when one of the sub-control devices of the switching equipment unit is occupied. Due to the previously described functionality of the switching equipment unit with the cooperation of two sub-control devices with reference to respectively one interrogating key, it is always assured in this case that the displayed call of higher priority is accepted after the corresponding interrogating key has been operated.

According to a further fashioning of the inventively proposed switching equipment unit, it can be provided that the display or, respectively, the screen 21 always displays all pending calls with respect to the switching person, whereby he can subsequently select and accept the call that is to be forwarded via the keyboard or via a mouse with a corresponding cursor movement given a graphic operator surface.

What is of particular importance of the switching equipment unit 7 shown in FIG. 1 is the key 23 of the operator console keyboard as referred to as "R", since the key 23 has the function to take calls, which have been forwarded to a wrong target device, back to the switching equipment unit 7 in order to subsequently forward these to the correct user. However, what is a precondition herefor is that the incorrectly forwarded call has not yet been accepted by the called user, since the switching equipment unit 7, otherwise, has no longer access to the incorrectly forwarded call. As soon as the switching person has operated the key 23 referred to as "R", the erroneously connected call is promptly switched to one of the sub-control devices 9, 11 or 13 that corresponds to the respective call type and is responsible for calls of higher priority. This means that a call that has to be taken back is basically treated the same way as an incoming call of highest priority, so that the call that is taken back can be promptly accepted by the switching person and can be connected anew.

The retrieval of an incorrectly connected call is subsequently generally explained on the basis of the block diagram shown in FIGS. 3a–c.

FIG. 3a shows a status, whereby the user 101 of the network node 100 calls the user 301 of the network node 300, whereby the corresponding connecting path is to be connected by means of the operating console 19 that is allocated to the network node 200. This means that the call of the user 101, within the communication network, is forwarded to the network node 200 and—depending on the priority of this call—either the sub-control device 8 or the sub-control device 9 is occupied there with this call and is activated by means of the call alotter 1 shown in FIG. 1 or 2, since, for example, a trunk call, which can be interrogated via the interrogating key 23 referred to as "A", is concerned in the present case (compare FIG. 1 or 2). After the corresponding interrogating key has been operated, the switching person accepts the call of the user 101 and forwards the call as desired by the caller 101, so that the terminal device of the called user 301 rings.

FIG. 3b shows the status when the call has been forwarded via the network node 200 to the user 301, whereby, in this status, the operating console 19 separated from the actual connecting path between the users 101 and 301, namely is no longer intermediately switched, and none of the sub-control devices 8–13 is occupied with the forwarded call.

It be subsequently assumed that the key referred to as "R" has been operated at the keyboard of the attendant console 19, since the switching person has realized that the call of the user 101 has been erroneously forwarded to the user 301, although, for example, the user 101 wanted to speak to the user 302 of the network node 300. In this case, the connection between the network nodes 200 and 300 is released after this retrieval key has been operated and the switching center of the operating console 19 is immediately connected again, via the network node 200, to the caller 101 in order to arrive again at the talk state with him. Thereby, the call that is taken back is immediately put on the sub-control device 9 of this switching center corresponding to its call type, since the call that is taken back is to be treated in the same way as a call of highest priority, so that the switching person can promptly accept the conversation with the caller 101 and can undertake another switching trial.

In addition, it is to be pointed out that the switching equipment unit 7 or, respectively, the communication apparatus is fashioned such that the function of the sub-control devices that are responsibl for the calls of higher priority can be optionally deactivated, so that—as it is already known from the prior art—the call processing exclusively occurs in conformity with the call forwarding by means of the call allocator 1 via the sub-control-devices, which are responsible for the normal calls. This is particularly expedient when the switching person is not to be burdened with the output of calls of higher priorities via the display or, respectively, the screen 21 with subsequent selection etc.

Although various minor changes and modifications might be proposed by those skilled in the art, it will be understood that my wish is to include within the claims of the patent warranted hereon all such changes and modifications as reasonably come within my contribution to the art.

What is claimed is:

1. A communication apparatus for a communication network, comprising:
    at least one switching equipment unit in order to accept calls within the communication network and in order to forward the accepted calls to a desired user of the communication network;
    at least one call distribution unit in order to distribute incoming calls within the communication network to the at least one switching equipment unit;
    a first control unit, whereby the call distribution unit automatically applying calls of lower priority thereto;
    a second control unit, the call distribution unit automatically applying calls of higher priority thereto; and
    a call acceptance unit having a call interrogator allocated to both the first and second control units, said call acceptance unit, when actuated, accepting via the call interrogator a call that is pending at the second control unit or, when no call is pending at the second control unit, the call acceptance unit accepting via the call interrogator a call that is pending at the first control unit.

2. The communication apparatus according to claim 1 wherein the communication apparatus is designed such that the calls are allocated to different call types, the call distribution unit according to the call type applies incoming calls to the corresponding first and second control units of the switching equipment unit.

3. The communication apparatus according to claim 2 wherein the communication apparatus is designed such that a corresponding priority is configured for each call type, whereby the call distribution unit applies the incoming calls pending on the priority or, when the calls have equal priority, the call distribution unit applies incoming calls according to a FIFO principle to the first or second control units of the switching equipment unit.

4. The communication apparatus according to claim 1 wherein the function of the second control unit is activated or deactivated according to the user, whereby the call distribution unit successively applies the incoming calls always to the first control unit when the second control unit is deactivated.

5. The communication apparatus according to claim 1 wherein call retrieval units are provided in order to switch a call, which has been switched by means of the switching equipment unit but has not yet been accepted by the desired user, back to the switching equipment unit and accepts it.

6. The communication apparatus according to claim 5 wherein the communication apparatus is designed such that a call, which is to be switched back to the switching equipment unit, is treated in a same way as a call with a higher priority.

7. The communication apparatus according to claim 5 wherein the call that was switched last by means of the switching equipment unit and that has not yet been accepted by the desired user is automatically applied, according to the call type, to the corresponding second control unit when the call retrieval units are operated.

8. The communication apparatus according to claim 5 wherein the call acceptance unit and the call retrieval unit comprise a keyboard.

9. The communication apparatus according to claim 5 wherein the call acceptance unit and the call retrieval unit comprise a graphic user surface.

10. The communication apparatus according to claim 1 wherein a display unit is provided for displaying calls that are pending at the switching equipment unit.

11. The communication apparatus according to claim 10 wherein the display units displays at least all calls of higher priority that are pending at the switching equipment unit.

12. A communication apparatus for a communication network, comprising:
    at least one switching equipment unit in order to accept calls within the communication network and in order to forward the accepted calls to a user of the communication network;
    at least one call distribution unit in order to distribute incoming calls within the communication network to the at least one switching equipment unit;
    a first control unit, whereby the call distribution unit automatically applies calls of lower priority thereto,
    a second control unit connected to the switching equipment unit, the call distribution unit automatically applying calls of higher priority thereto; and
    a call acceptance unit having a call interrogator allocated to both the first and second control units, said call acceptance unit accepting via the call interrogator a call that is pending at the second control unit or, when no call is pending at the second control unit, the call acceptance unit accepting via the call interrogator a call that is pending at the first control unit.

13. A communication apparatus for a communication network, comprising:
    at least one switching equipment unit in order to accept calls within the communication network and in order to forward the accepted calls to a desired user of the communication network;
    at least one call distribution unit in order to distribute incoming calls within the communication network to the at least one switching equipment unit;
    a first control unit, whereby the call distribution unit automatically applying calls of lower priority thereto;
    a second control unit, the call distribution unit automatically applying calls of higher priority thereto; and
    a call acceptance unit allocated to the first and second control units, said call acceptance unit, when actuated, accepting a call that is pending at the second control unit or, when no call is pending at the second control unit, the call acceptance unit accepting a call that is pending at the first control unit;
    wherein call retrieval units are provided in order to switch a call, which has been switched by means of the switching equipment unit but has not yet been accepted by the desired user, back to the switching equipment unit and accepts it;
    wherein the communication apparatus is designed such that a call, which is to be switched back to the switching equipment unit, is treated in a same way as a call with a higher priority.

14. A communication apparatus for a communication network, comprising:
    at least one switching equipment unit in order to accept calls within the communication network and in order to forward the accepted calls to a desired user of the communication network;
    at least one call distribution unit in order to distribute incoming calls within the communication network to the at least one switching equipment unit;
    a first control unit, whereby the call distribution unit automatically applying calls of lower priority thereto;
    a second control unit, the call distribution unit automatically applying calls of higher priority thereto; and a call acceptance unit allocated to the first and second control units, said call acceptance unit, when actuated, accepting a call that is pending at the second control unit or, when no call is pending at the second control unit, the call acceptance unit accepting a call that is pending at the first control unit;

wherein call retrieval units are provided in order to switch a call, which has been switched by means of the switching equipment unit but has not yet been accepted by the desired user, back to the switching equipment unit and accepts it;

wherein the call that was switched last by means of the switching equipment unit and that has not yet been accepted by the desired user is automatically applied, according to the call type, to the corresponding second control unit when the call retrieval units are operated.

* * * * *